(12) United States Patent
Sakai et al.

(10) Patent No.: US 8,024,067 B2
(45) Date of Patent: Sep. 20, 2011

(54) WORKING STATION

(75) Inventors: Yoshiharu Sakai, Tochigi (JP); Tetsuya Ozawa, Tochigi (JP); Kazuyoshi Fukuzawa, Tochigi (JP); Yoshito Ohtake, Tochigi (JP); Hiroki Baba, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 972 days.

(21) Appl. No.: 11/915,289

(22) PCT Filed: May 24, 2006

(86) PCT No.: PCT/JP2006/310362
§ 371 (c)(1),
(2), (4) Date: Nov. 21, 2007

(87) PCT Pub. No.: WO2006/126591
PCT Pub. Date: Nov. 30, 2006

(65) Prior Publication Data
US 2009/0030549 A1   Jan. 29, 2009

(30) Foreign Application Priority Data
May 24, 2005  (JP) .................. 2005-151299

(51) Int. Cl.
*G06F 19/00*  (2006.01)
(52) U.S. Cl. ..... 700/245; 700/246; 700/247; 318/568.1; 318/568.12; 348/65; 348/76; 348/376; 348/108; 156/87; 156/285; 156/382; 156/583.3
(58) Field of Classification Search ............ 700/245, 700/246, 247; 348/65, 76, 376; 257/E25.032, 257/E23.132, 758, 320, 640, 643, 773, 776; 318/568.1, 568.12; 156/87, 285, 382, 583.3; 349/108

See application file for complete search history.

(56) References Cited

U.S. PATENT DOCUMENTS

| | | | | |
|---|---|---|---|---|
| 3,226,572 A * | 12/1965 | Kuroda | ......................... | 327/225 |
| 4,519,491 A * | 5/1985 | Prodel et al. | .................. | 198/349 |
| 4,609,137 A * | 9/1986 | De Filippis | .................. | 228/49.6 |
| 4,787,496 A * | 11/1988 | Prodel et al. | ............... | 198/346.1 |
| 5,760,560 A * | 6/1998 | Ohya et al. | ................. | 318/568.1 |
| 6,145,180 A * | 11/2000 | Kogai et al. | ..................... | 29/429 |
| 6,392,709 B1* | 5/2002 | Orito | ............................ | 348/569 |
| 7,428,837 B2* | 9/2008 | Takayama | ...................... | 72/20.5 |
| 2003/0225479 A1 | 12/2003 | Waled | | |
| 2010/0236046 A1* | 9/2010 | Lundberg et al. | ............... | 29/430 |

FOREIGN PATENT DOCUMENTS

| | | | |
|---|---|---|---|
| DE | 199 17 908 | * | 3/2000 |
| DE | 103 24 627 | | 1/2005 |
| JP | 61-133417 | | 6/1986 |
| JP | 61133417 | | 6/1986 |

(Continued)

*Primary Examiner* — James P Trammell
*Assistant Examiner* — McDieunel Marc
(74) *Attorney, Agent, or Firm* — Rankin, Hill & Clark LLP

(57) ABSTRACT

Immediately before a robot 20 starts to move at a high speed, a monitoring area 53 is expanded in a returning direction Y, and absence of an obstacle in the monitoring area 53 is confirmed. During the high speed movement of the robot 20, the monitoring area 53 is expanded forward, so that a safety of an operator is secured, an effective use of a working station area can be made, and an improvement of productivity can be achieved.

2 Claims, 16 Drawing Sheets

FOREIGN PATENT DOCUMENTS

| | | |
|---|---|---|
| JP | 7137675 | 5/1995 |
| JP | 8-141945 | 6/1996 |
| JP | 8141945 | 6/1996 |
| JP | 2000-033592 | 4/2003 |
| WO | 2005/017306 | 2/2005 |

\* cited by examiner

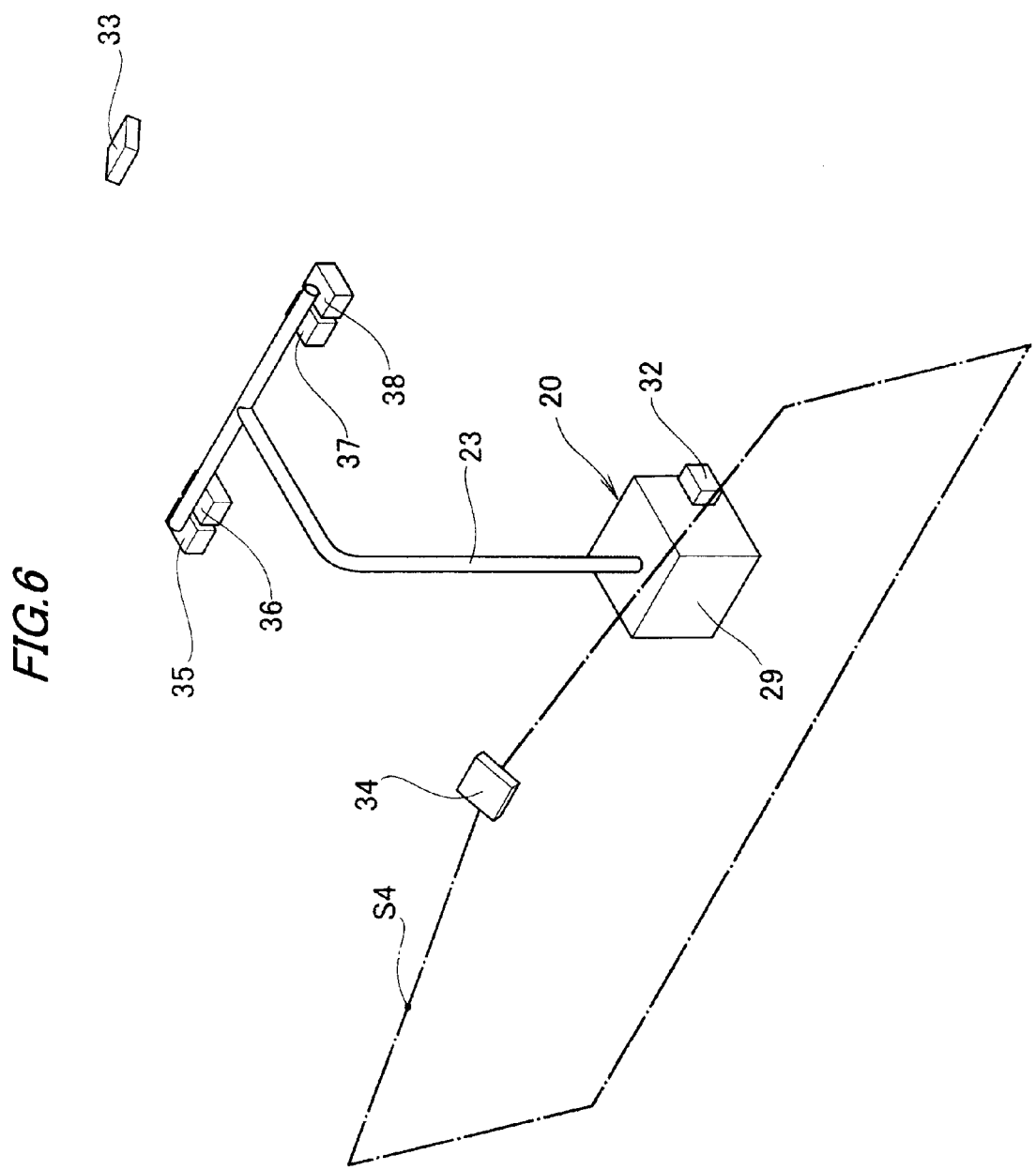

WORKING STATION

TECHNICAL FIELD

The present invention relates to a safety system of a working station where an operator coexists with an apparatus such as a robot.

BACKGROUND ART

Conventionally, in a working station where an operator coexists with an apparatus such as a robot, the apparatus has been surrounded by a safety fence so that the operator may not enter into the safety fence while the apparatus is in operation. However, because the safety fence is fixed, and it largely surrounds a movable range of the apparatus, a working station area including a working area of the operator naturally grows larger, which has incurred an increase of a floor space of a work place.

In JP-B2-3419313, there is disclosed a safety system in place of the safety fence, for the purpose of making effective use of the working station area.

FIG. 12 is a view for explaining the safety system in JP-B2-3419313, in which robots 101 move along a running path 102 to perform work on facilities 103. A detection range A1 is set around each of the robots 101, and when an operator M gets in touch with this detection range A1, movement of the robot 101 is stopped.

Because the detection range A1 moves together with the robot 101, it is possible to use the working station area more effectively, as compared with the fixed safety fence. The detection range A1 had better be as large as possible, from a viewpoint of safety of the operator M. However, as the detection range A1 is made larger, the working station area grows larger inevitably, and a moving distance of the robot 101 is increased, which incurs deterioration of productivity.

In view of the above, such technique that safety of an operator can be secured without increasing a working station area, when productivity is improved, has been required.

DISCLOSURE OF THE INVENTION

One or more embodiments of the invention provide a safety system in which safety of an operator can be secured without increasing a working station area.

According to one or more embodiments of the invention, a safety system which secures safety, by setting a monitoring area for monitoring presence or absence of an obstacle around an apparatus is provided in a working station where operations such as machining, measuring, attaching parts etc. are performed on works which are carried on a carriage, by an operator mounted on the carriage and an apparatus such as a robot which moves synchronously with the carriage, and the safety system is provided with a monitoring area control section for changing the monitoring area according to a moving direction and a moving speed of the apparatus.

Moreover, according to one or more embodiments of the invention, the monitoring area control section may perform controls for expanding or contracting the monitoring area in front of the apparatus, according to the moving speed.

According to one or more embodiments of the invention, the monitoring area control section can set the monitoring area according to the movement of the apparatus.

Conventionally, in case where a dimension of the monitoring area is fixed, and the apparatus moves at a high speed or at a low speed, the monitoring area is set on a high speed side, from a viewpoint of safety. As the results, the working station area including the monitoring area is enlarged.

On the other hand, in this invention, the working station area will not be unnecessarily enlarged, because the monitoring area is expanded when the apparatus moves at a high speed, and contracted when the apparatus moves at a low speed. In short, according to the invention, the safety of the operator can be secured without increasing the working station area.

Further, in case where the monitoring area control section performs controls for expanding or contracting the monitoring area in front of the apparatus, according to the moving speed, it is possible to expand the monitoring area forward during the high speed movement of the apparatus, whereby the safety of the operator can be secured.

Other aspects and advantages of the invention will be apparent from the following description and the appended claims.

BRIEF DESCRIPTION OF THE DRAWINGS

FIG. 3($b$) is a view for explaining scanning.

FIG. 3($c$) is a view showing a detecting plane in a polygonal shape.

FIG. 6 is a view for explaining a detecting plane of a fourth sensor.

FIG. 7($b$) is a view for explaining detecting planes of the fifth sensor and the eighth sensor, at a time of high speed movement of the robot (at a time of returning).

FIG. 8($b$) is a view for explaining detecting planes of the sixth sensor and the seventh sensor, at the time of high speed movement of the robot (at the time of returning).

FIG. 9($b$) is a view showing a warning area.

FIG. 9($c$) is a view showing a monitoring area in which the protecting area and the warning area are combined.

FIG. 10($b$) is a view for explaining the monitoring area when the robot has finished working, at the time of ordinary movement of the robot.

FIG. 11($b$) is a view for explaining the monitoring area during the high speed movement of the robot.

DESCRIPTION OF REFERENCE NUMERALS AND SIGNS

Figure 1:
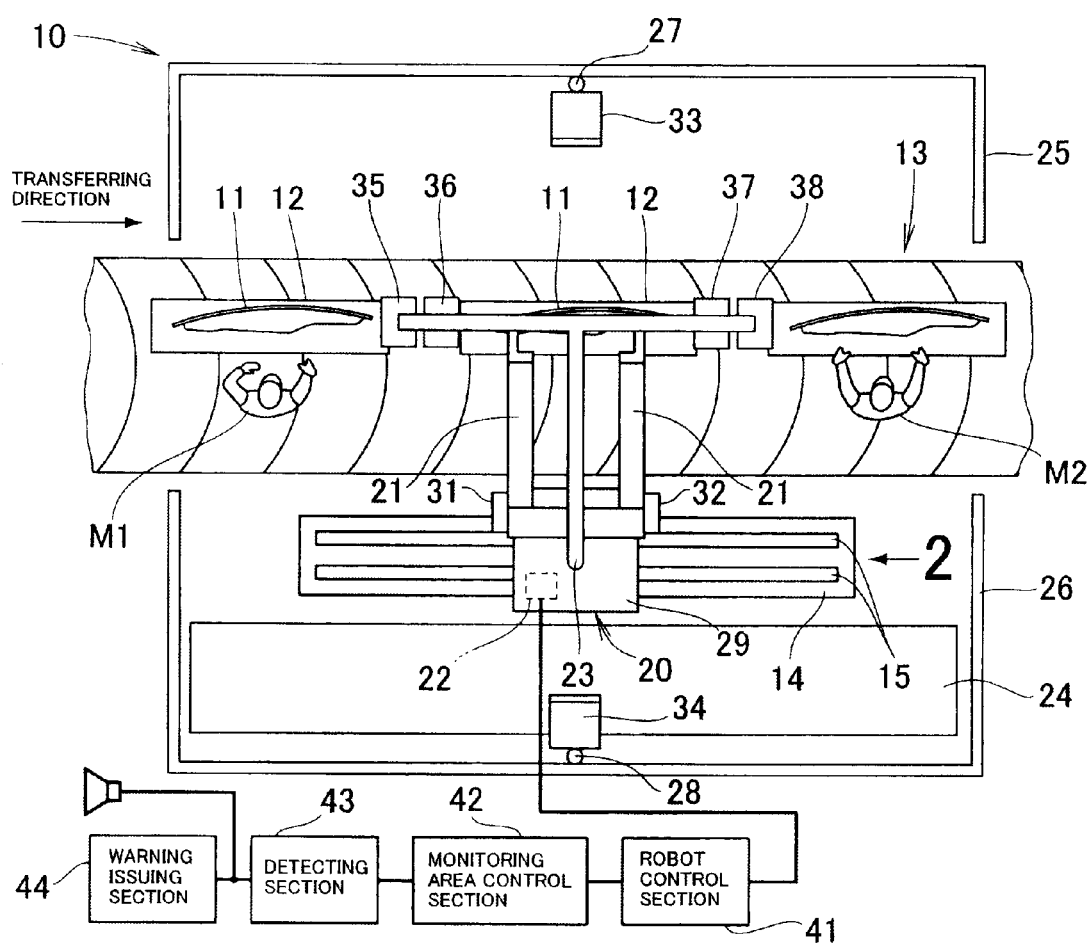
FIG. 1 is a plan view showing a safety system of a working station according to an exemplary embodiment of the invention.

10 . . . Safety system of working station, 11 . . . Work, 13 . . . Conveyor, 20 . . . Robot, 42 . . . Monitoring area control section, 53 . . . Monitoring area, M1 . . . Operator at a delivery side, M2 . . . Operator at a receiving side

BEST MODE FOR CARRYING OUT THE INVENTION

Now, referring to the drawings, an exemplary embodiment of the invention will be described. It is to be noted that the drawings should be seen in a direction of the reference numerals.

FIG. 1 is a plan view showing the safety system of the working station according to the exemplary embodiment of the invention. A working station 10 includes pallets 12 on which works 11 are placed, a conveyor 13 (a carriage 13) for transferring these pallets 12, a rail chassis 14 installed on a floor of the working station 10, rails 15 mounted on this rail chassis 14, and a robot 20 (an apparatus 20) which moves on the rails 15 synchronously with the conveyor 13. This robot 20 is provided with robot arms 21, 21, a pulse encoder 22, and a robot post 23. Numeral 24 is a parts feeder, 25, 26 are fences, and 27, 28 are sensor posts.

Moreover, a first sensor 31 and a second sensor 32 are provided at right and left ends in the drawing of a chassis part 29 of the robot 20. In the drawing, numeral 33 is a third sensor, 34 is a fourth sensor, 35 is a fifth sensor, 36 is a sixth sensor, 37 is a seventh sensor, 38 is an eighth sensor, 41 is a robot control section, 42 is a monitoring area control section, 43 is a detecting section, 44 is a warning issuing section, M1 is an operator at a delivery side, M2 is an operator at a receiving side.

The robot control section 41 outputs signals of positional information, speed information, and directional information of the robot 20, according to operations of the robot 20. A position of the robot 20 which is obtained from the pulse encoder 22 provided on the robot 20 is outputted as the positional information. Either one of conditions of ordinary movement (at a time of working), stopping (at a time of finishing the work), and high speed movement (at a time of returning) is outputted according to the movement of the robot 20, as the speed information. Either one of a working direction and a returning direction is outputted according to a moving direction of the robot 20, as the directional information. It is to be noted that a direction in which the robot 20 moves in a transferring direction of the works 11 is called as the working direction, and a direction opposite to the working direction is called as the returning direction (the same goes hereinafter).

The monitoring area control section 42 controls the monitoring area (reference numeral 53 in FIGS. 9(a) to 9(c), which will be described below in detail) on the basis of the signals of the positional information, speed information, and directional information. The detecting section 43 outputs a detection signal by detecting an obstacle in the monitoring area (reference numeral 53 in FIGS. 9(a) to 9(c)) which is composed of the first to the eighth sensors 31-38.

Figure 9A:
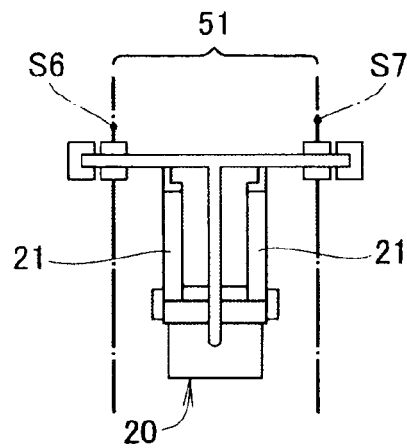
FIG. 9($a$) is a view showing a protecting area.
Figure 9B:
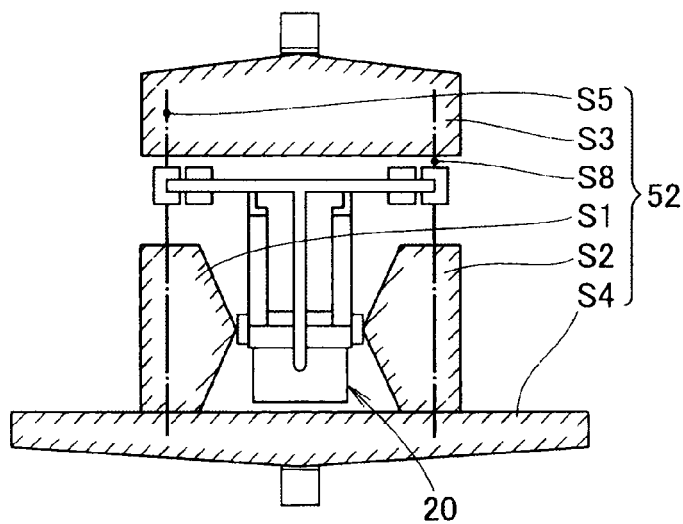
Figure 9C:
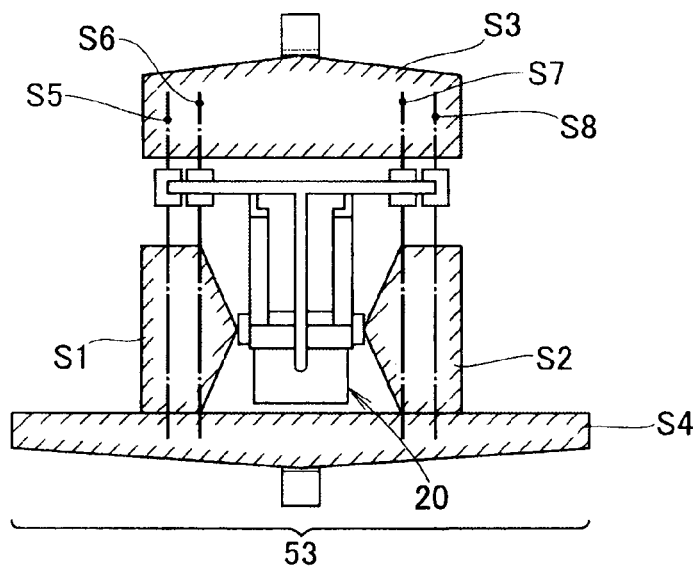

The warning issuing section 44 receives an input of the detection signal, and judges whether it is the input by a protecting area (reference numeral 51 in FIGS. 9(a) to 9(c)) or by a warning area (reference numeral 52 in FIGS. 9(a) to 9(c)), to perform a warning motion. For example, in case where the detection signal by the protecting area 51 is inputted during the ordinary movement, the operators M1, M2 will be cautioned with a warning sound or a warning light, and the movements of the robot 20 and the conveyer 13 will be stopped. In case where the detection signal by the warning area 52 is inputted, the operators M1, M2 will be cautioned with a warning sound or a warning light.

Moreover, in case where the detection signal by the monitoring area (reference numeral 53 in FIGS. 9(a) to 9(c)) combining the protecting area (reference numeral 51 in FIGS. 9(a) to 9(c)) and the warning area (reference numeral 52 in FIGS. 9(a) to 9(c)) is inputted during the high speed movement, the operators M1, M2 will be cautioned with a warning sound or a warning light, and the movements of the robot 20 and the conveyer 13 will be stopped.

Figure 2:
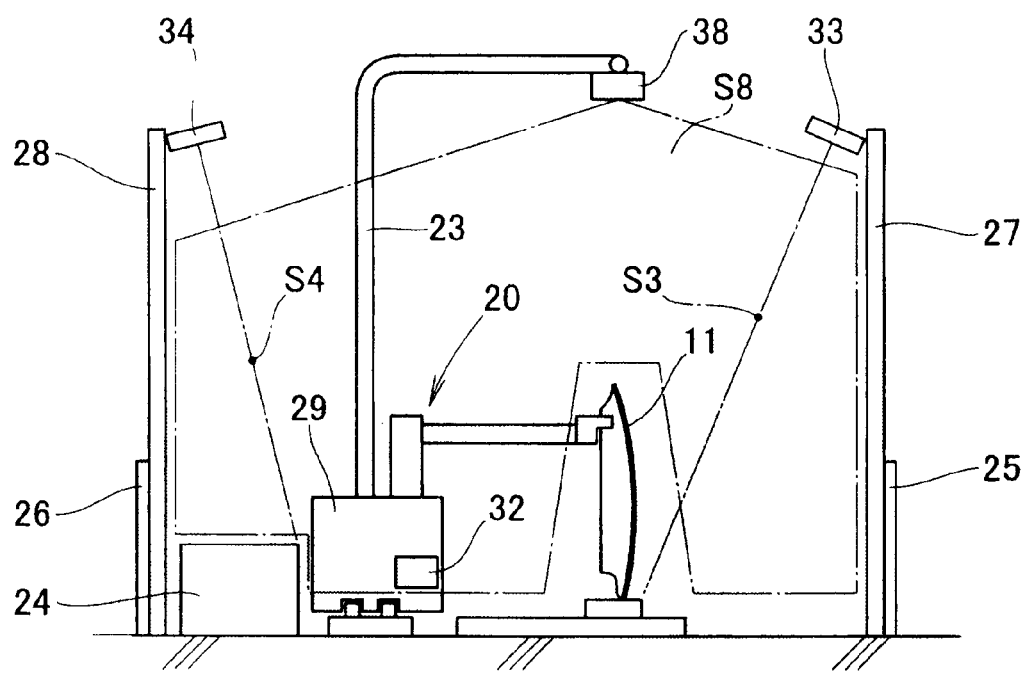
FIG. 2 is a view as seen from a direction of an arrow mark 2 in FIG. 1.

FIG. 2 is a view as seen from a direction of an arrow mark 2 in FIG. 1. The robot post 23 in an L-shape is provided upright on the chassis part 29, and the eighth sensor 38 is mounted on this robot post 23. It is shown in FIG. 2 that the eighth sensor 38 has set a detecting plane S8 having a polygonal shape. Moreover, the third sensor 33 having a detecting plane S3 is mounted at a top of the sensor post 27, and the fourth sensor 34 having a detecting plane S4 is mounted at a top of the sensor post 28. Details of the detecting planes S3, S4, and S8 will be described below.

Figure 3A:
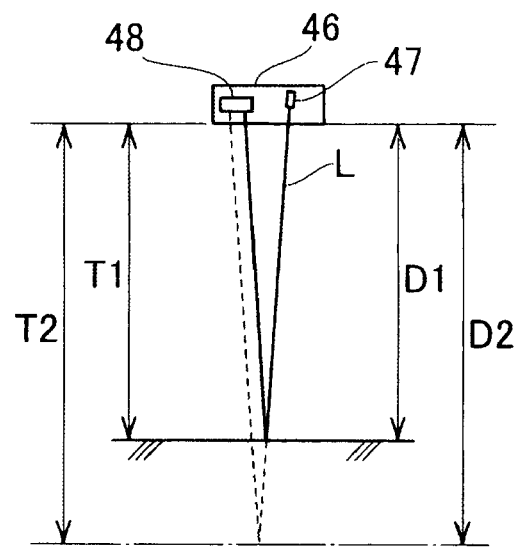
FIG. 3($a$) is a view showing principle of detection of a laser scanner sensor.
Figure 3B:
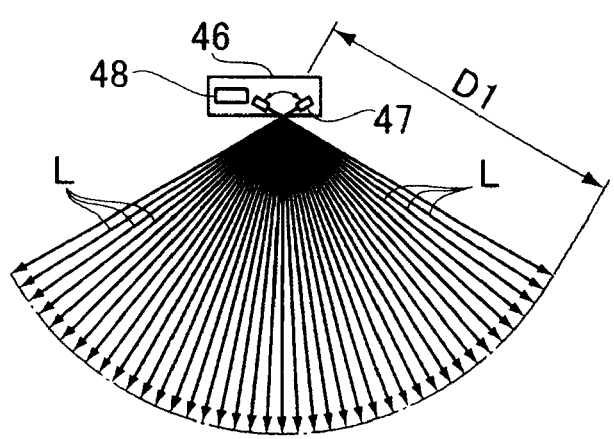
Figure 3C:
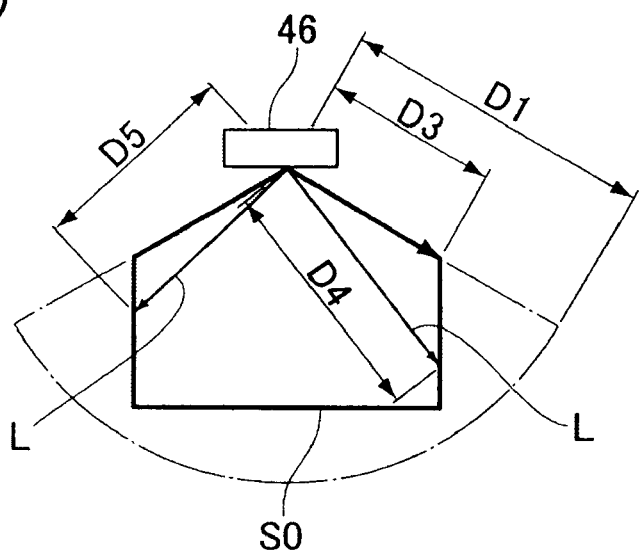

Now, operation of the safety system as described above will be described. FIGS. 3(a) to 3(c) are views for explaining a detecting range of a laser scanner sensor according to the invention. FIG. 3(a) shows principle of detection by a laser scanner sensor 46. The laser scanner sensor 46 generates an electromotive force, when a laser beam L emitted from a light projector 47 is reflected by an obstacle, and the reflected laser beam L is received by a light receiver 48. The obstacle is detected by presence or absence of this electromotive force. Provided that a detecting time of the obstacle at a distance D1 from the laser scanner sensor 46 is T1, and a detecting time of the obstacle at a distance D2 is T2, the detecting time T1 is smaller than T2, in case where the distance D1 is smaller than D2. The detecting time means a time after the laser beam L has been emitted from the light projector 47 until the laser beam L which has been reflected by the obstacle is received by the light receiver 48.

A threshold value (a threshold time) is set between the time T1 and the time T2, and it is so set that a time exceeding the threshold value may be cut. Then, it becomes possible to judge presence or absence of the obstacle only for the time below the threshold value. According to this method, an effective distance for detection can be set, as desired.

FIG. 3(b) is a view for explaining scanning. The laser beam L is emitted by moving the light projector 47 at a high speed electrically or mechanically to perform oscillating motion, and detections are carried out continuously at equal intervals, whereby a detecting plane in a radial shape having a distance D1 from the light projector 47 is formed. In this manner, it is possible to carry out the detection, as a plane, by scanning with the single laser scanner sensor 46. FIG. 3(c) shows that in a process for forming the detecting plane in a radial shape, the detecting distance is increased or decreased to set distances D3, D4, D5, while the high speed oscillating motion is made, whereby a detecting plane S0 in a polygonal shape can be formed.

As described, the laser scanner sensor 46 is applicable to the first to eighth sensors 31-38 in FIG. 1, and can detect the obstacles such as the operators M1, M2 or the robot arms 21, 21 when the obstacles have entered into the detecting plane S0.

Figure 4:
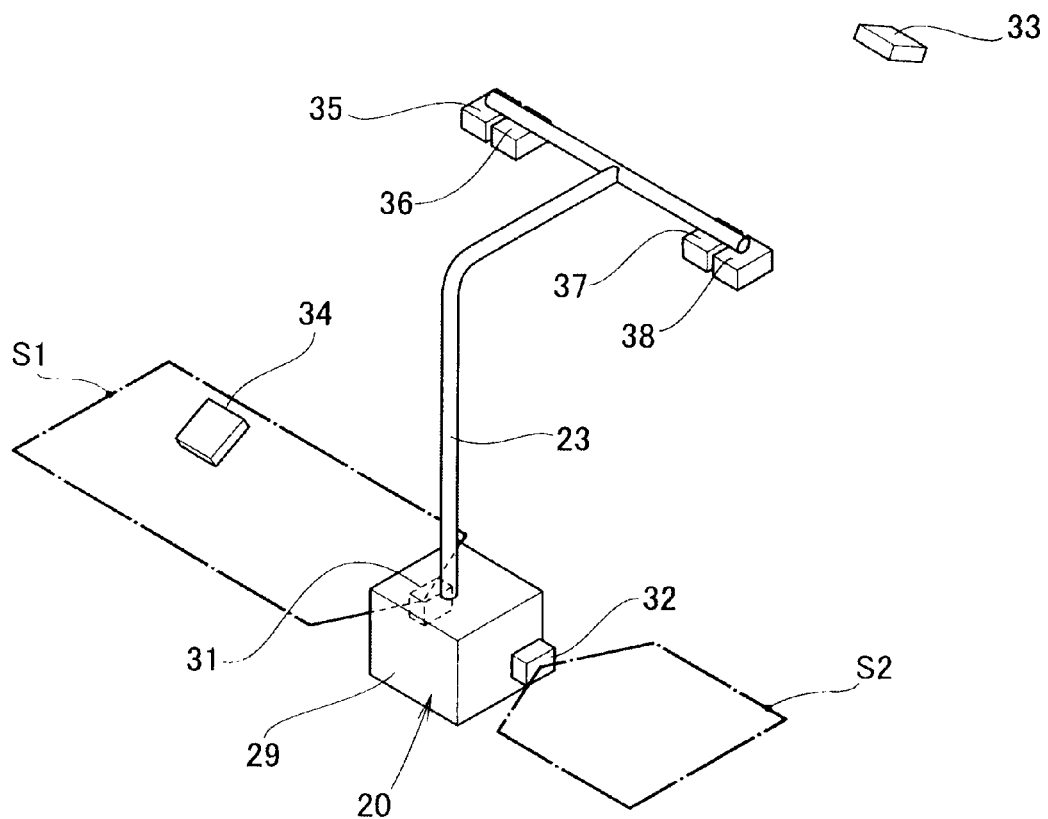
FIG. 4 is a view for explaining detecting planes of a first sensor and a second sensor.

FIG. 4 is a view for explaining detecting planes of the first sensor and the second sensor according to the exemplary embodiment of the invention. A detecting plane S1 is set by the first sensor 31 provided on the robot 20, and a detecting plane S2 is set by the second sensor 32. The detecting planes S1, S2 are so set as to detect intrusion of the operators M1 or M2 into vicinity of the robot 20 in FIG. 1.

Figure 5:
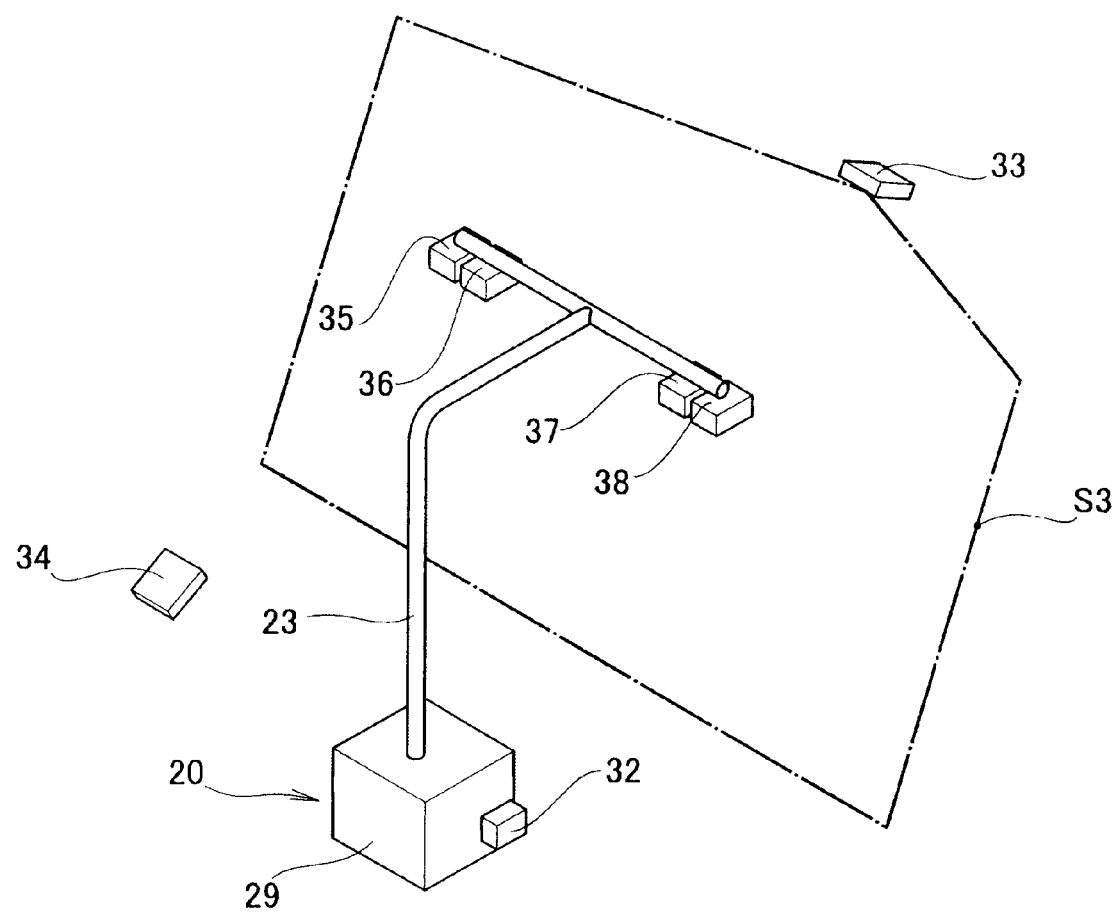
FIG. 5 is a view for explaining a detecting plane of a third sensor.

FIG. 5 is a view for explaining a detecting plane of the third sensor according to the exemplary embodiment of the invention. A detecting plane S3 is set by the third sensor 33. The detecting plane S3 is so set as to detect intrusions of the operators M1, M2 and other operators who approach to vicinity of the work 11 on which the robot 20 works, from outside of the fence 25 in FIG. 1.

FIG. 6 is a view for explaining a detecting plane of the fourth sensor according to the exemplary embodiment of the invention. A detecting plane S4 is set by the fourth sensor 34. The detecting plane S4 is set by fixing a detecting range so as to detect intrusion of the operators M1, M2 and other operators who approach to vicinity of the work 11 on which the robot 20 works, from outside of the fence 26 in FIG. 1.

Figure 7A:
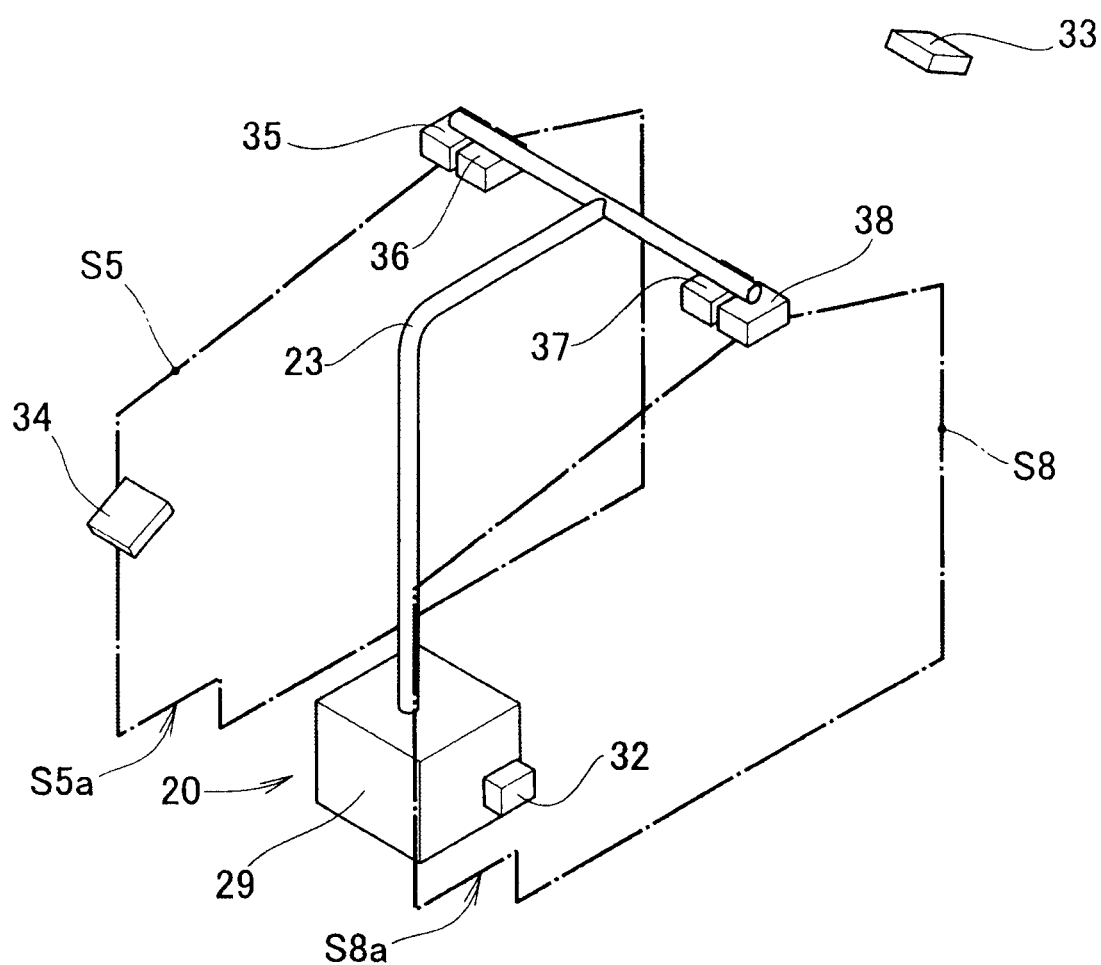
FIG. 7($a$) is a view for explaining detecting planes of a fifth sensor and an eighth sensor, at a time of ordinary movement of the robot (at a time of working).
Figure 7B:
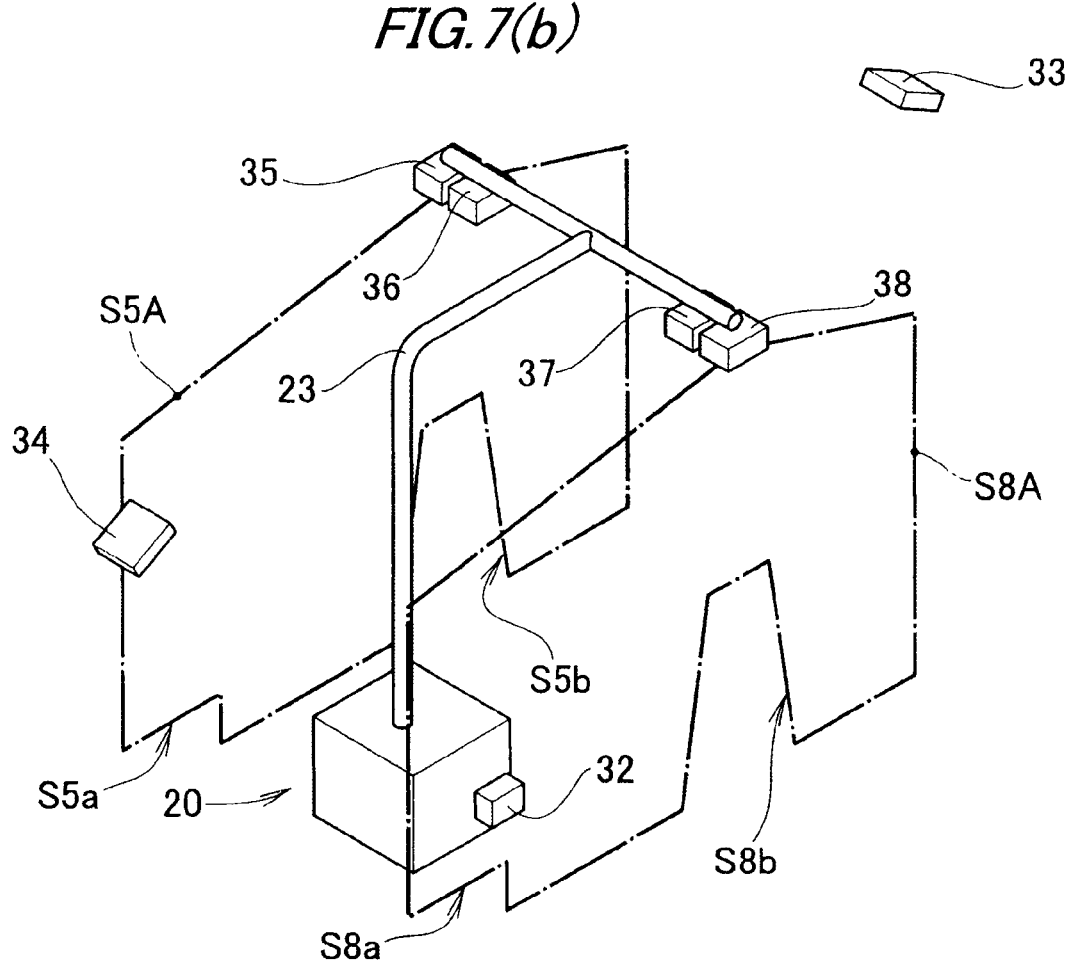

FIGS. 7(*a*) and 7(*b*) are views for explaining detecting planes of the fifth sensor and the eighth sensor according to the exemplary embodiment of the invention. FIG. 7(*a*) is a view for explaining the detecting planes at the time of ordinary movement (at the time of working) of the robot 20, and shows that a detecting plane S5 is set by the fifth sensor 35 mounted on the robot post 23, and a detecting plane S8 is set by the eighth sensor 38. It is to be noted that cut-out parts S5*a* and S8*a* are respectively formed in the detecting planes S5 and S8 so as to avoid interference with the parts feeder (numeral 24 in FIG. 2).

FIG. 7(*b*) is a view for explaining the detecting planes at the time of high speed movement (at the time of returning) of the robot 20. Detecting planes S5A and S8A are set by forming cut-out parts S5*b* and S8*b* respectively in the detecting planes S5, S8 which are shown in FIG. 7(*a*) so as to avoid interference with the work (numeral 11 in FIG. 2) during the high speed movement.

Figure 8A:
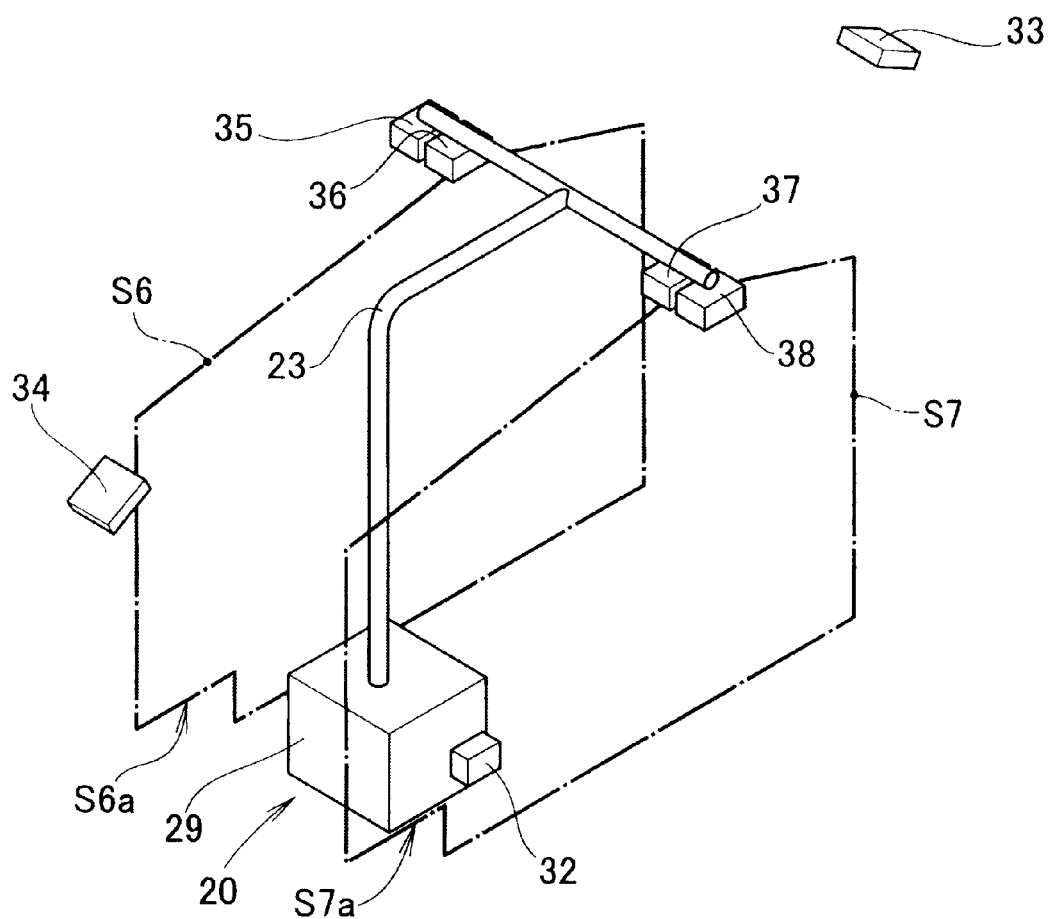
FIG. 8($a$) is a view for explaining detecting planes of a sixth sensor and a seventh sensor, at the time of ordinary movement of the robot (at the time of working).
Figure 8B:
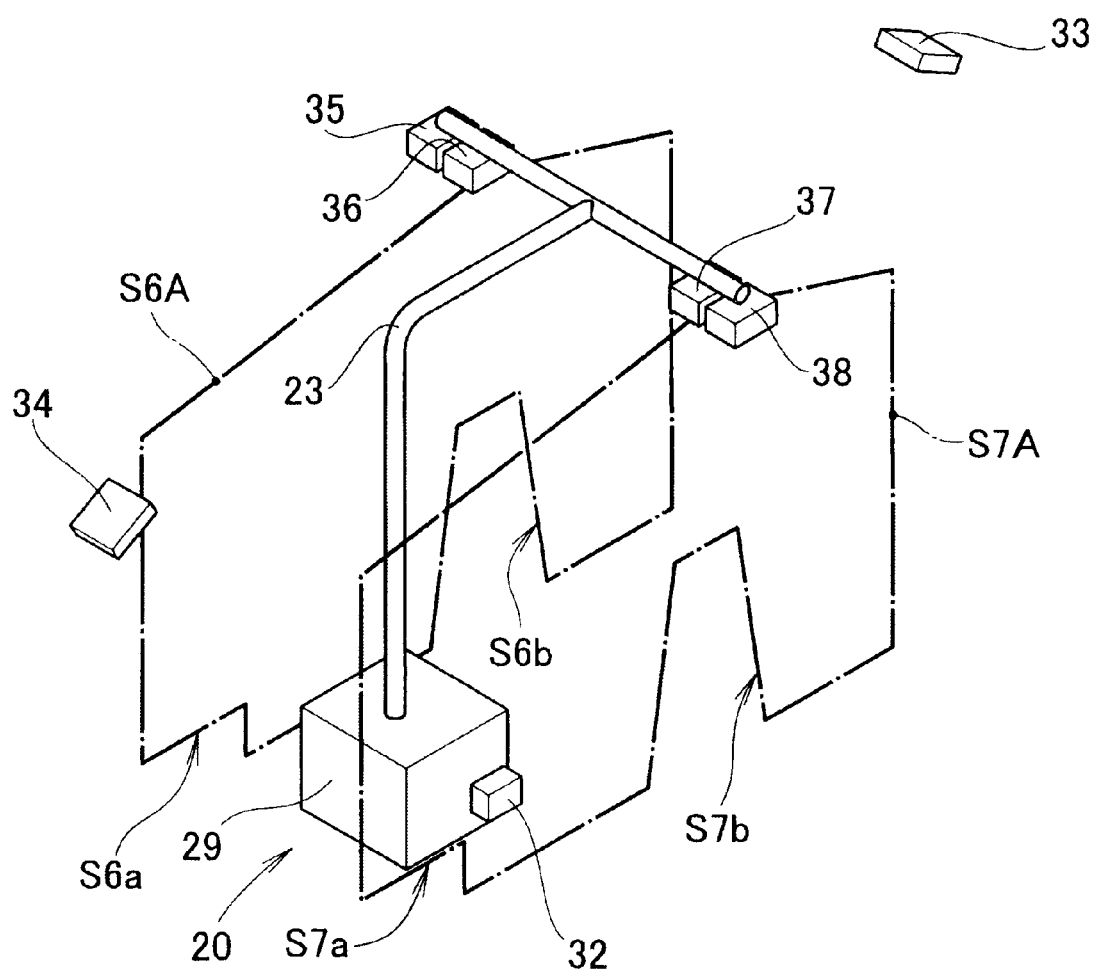

FIGS. 8(*a*) and 8(*b*) are views for explaining detecting planes of the sixth sensor and the seventh sensor according to the exemplary embodiment of the invention. FIG. 8(*a*) is a view for explaining the detecting planes at the time of ordinary movement (at the time of working) of the robot 20, and shows that a detecting plane S6 is set by the sixth sensor 36 mounted on the robot post 23, and a detecting plane S7 is set by the seventh sensor 37. It is to be noted that the detecting planes S6, S7 are set by forming cut-out parts S6*a* and S7*a* respectively, so as to avoid interference with the parts feeder (numeral 24 in FIG. 2).

FIG. 8(*b*) is a view for explaining the detecting planes at the time of high speed movement (at the time of returning) of the robot 20. Detecting planes S6A and S7A are set by forming cut-out parts S6*b* and S7*b* respectively in the detecting planes S6, S7 which are shown in FIG. 8(*a*), so as to avoid interference with the work (numeral 11 in FIG. 2), during the high speed movement.

FIGS. 9(*a*) to 9(*c*) are views showing a basic structure of the monitoring area according to the exemplary embodiment of the invention. It is to be noted that in the drawings, description is made referring to the time of ordinary movement, as an example, and that the detecting planes which are set in a back and forth direction in the drawings are shown by a phantom line, for the sake of convenience. FIG. 9(*a*) shows a protecting area 51 composed of the detecting planes S6 and S7. This protecting area 51 is an area where the movements of the robot 20 and the conveyor 13 are stopped, by detecting intrusions of the operators (numerals M1, M2 in FIG. 1) and the robot arms 21, 21, when the robot 20 has overdriven.

FIG. 9(*b*) shows a warning area 52 composed of the detecting planes S1 to S5 and S8. This warning area 52 is an area where a warning sound or a warning light is issued by the warning issuing section (numeral 44 in FIG. 1) to caution the operators (numerals M1, M2 in FIG. 1), by detecting intrusion of the operators M1, M2.

FIG. 9(*c*) shows a monitoring area 53. This monitoring area 53 is an area combining the protecting area 51 which is shown in FIG. 9(*a*) and the warning area 52 which is shown in FIG. 9(*b*), and composed of the detecting planes S1 to S8. This monitoring area 53 is an area where presence or absence of an obstacle such as the operators (numerals M1, M2 in FIG. 1) and the robot arms 21, 21 is monitored.

The safety system secures the safety, by setting the monitoring area (numeral 53 in FIG. 9(*c*)) for monitoring presence or absence of the operators M1, M2 around the robot 20 and the moving ranges of the robot arms 21, 21 when the robot 20 has overdriven, in the working station 10 where operations such as machining, measuring, attaching parts etc. are performed on the works 11 transferred by the conveyor 13, by the operators M1, M2 on the conveyor 13 and the apparatus such as the robot 20 which moves synchronously with the conveyor 13, in FIG. 1.

Although the monitoring area 53 which are shown in FIGS. 9(*a*) to 9(*c*) is formed by combining a plurality of the detecting planes in this embodiment, it is possible to fix an infrared sensor of a reflective type, for example, to an upper part of the robot 20, thereby to set the warning area 52 as a detecting area of a conical shape, making this sensor as an apex of the conical shape. Anyway, the monitoring area 53 can take any desired shape.

Moreover, the monitoring area 53 had better be as large as possible from a viewpoint of safety, and as small as possible from a viewpoint of effective use of the working station area. Therefore, the monitoring area 53 may be set considering both the safety and the effective use of the working station area.

Figure 10A:
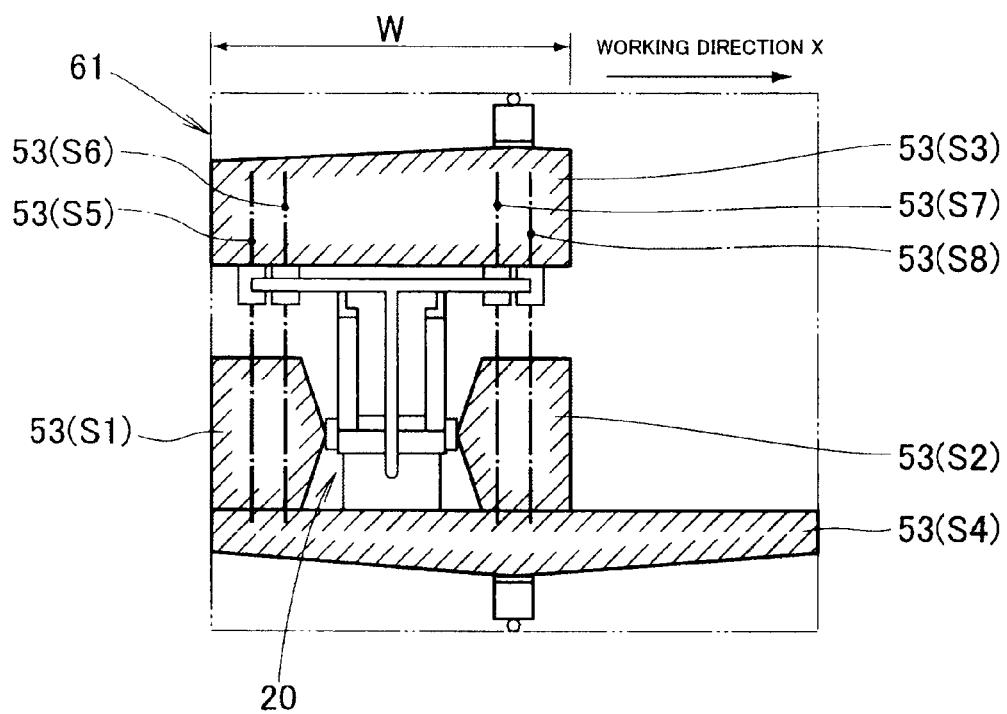
FIG. 10($a$) is a view for explaining the monitoring area before start of working, at the time of ordinary movement of the robot.
Figure 10B:
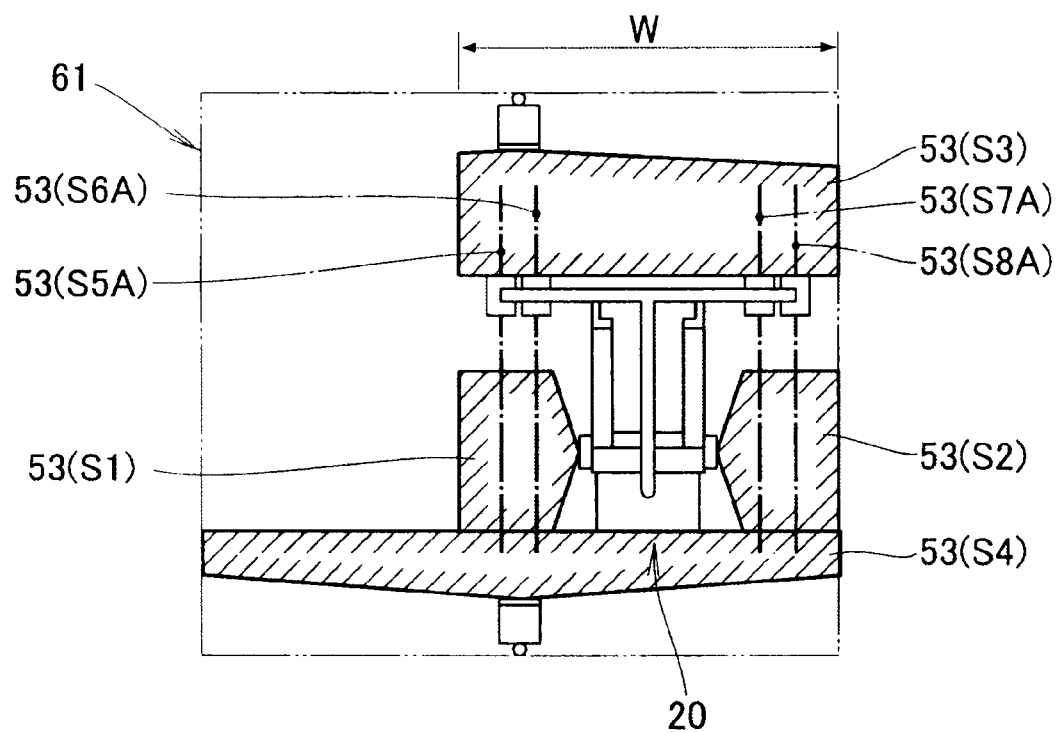

FIGS. 10(*a*) and 10(*b*) are views for explaining the monitoring area at the time of ordinary movement of the robot according to the exemplary embodiment of the invention. FIG. 10(*a*) shows the monitoring area 53 when the robot 20 starts to work. This monitoring area 53 is set according to a working area 61 of the robot, and composed of the detecting planes S4 to S8, and the detecting planes S1 to S3 having a width W in a working direction X. When the robot 20 moves in the working direction X, the detecting plane S3 is moved following the position of the robot 20, whereby the monitoring area 53 which includes the detecting planes S1 to S3 having the width W is always set near the robot 20.

This monitoring area 53 is controlled by the monitoring area control section (numeral 42 in FIG. 1) on the basis of the positional information, the speed information of "the ordinary movement", and the directional information of "the working direction" which are outputted from the robot control section (numeral 41 in FIG. 1).

FIG. 10(*b*) shows the monitoring area 53 when the robot 20 has finished working. The movement of the robot 20 is stopped in a state where the monitoring area 53 which includes the detecting planes S1 to S3 having the width W has been set, and the detecting planes S5 to S8 which are shown in FIG. 10(*a*) are respectively switched to the detecting planes S5A to S8A. This monitoring area 53 is controlled by the monitoring area control section (numeral 42 in FIG. 1) on the basis of the positional information, the speed information of "stopping", and the directional information of "the working direction" which are outputted from the robot control section (numeral 41 in FIG. 1).

Figure 11A:
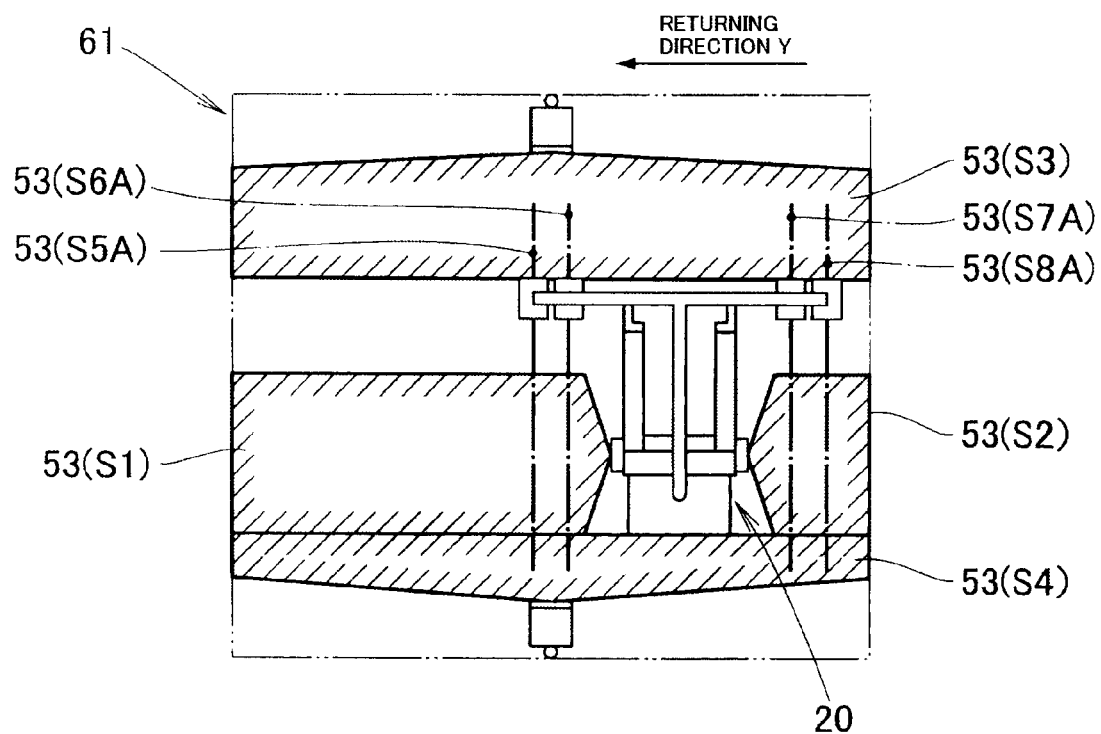
FIG. 11($a$) is a view for explaining the monitoring area immediately before the high speed movement of the robot.
Figure 11B:
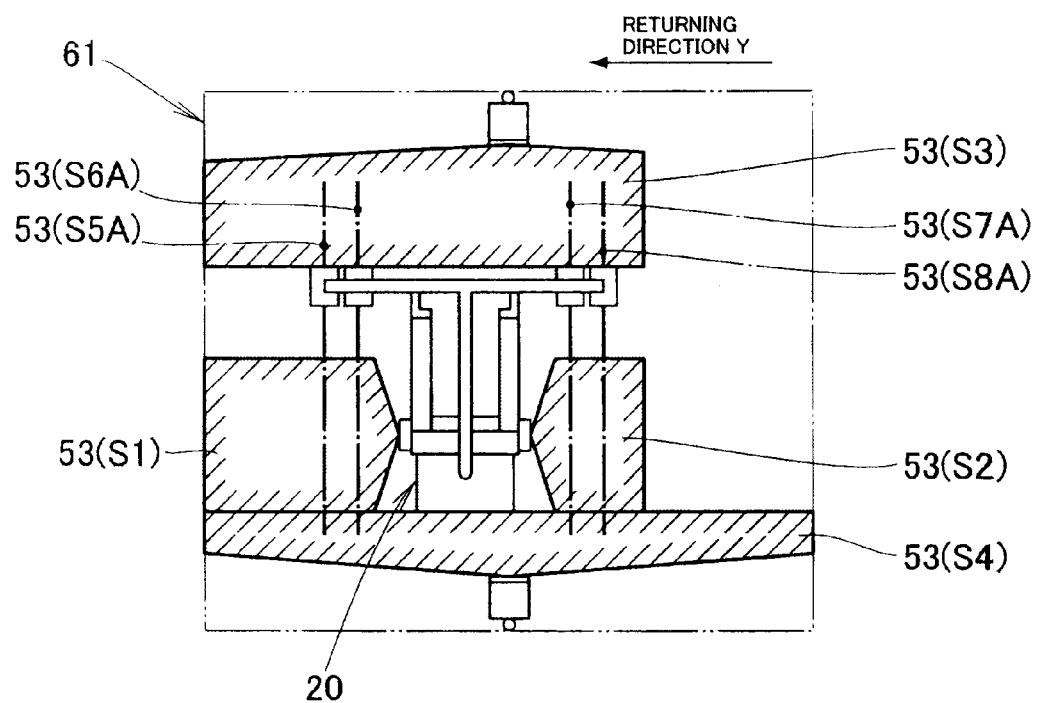
Figure 12:
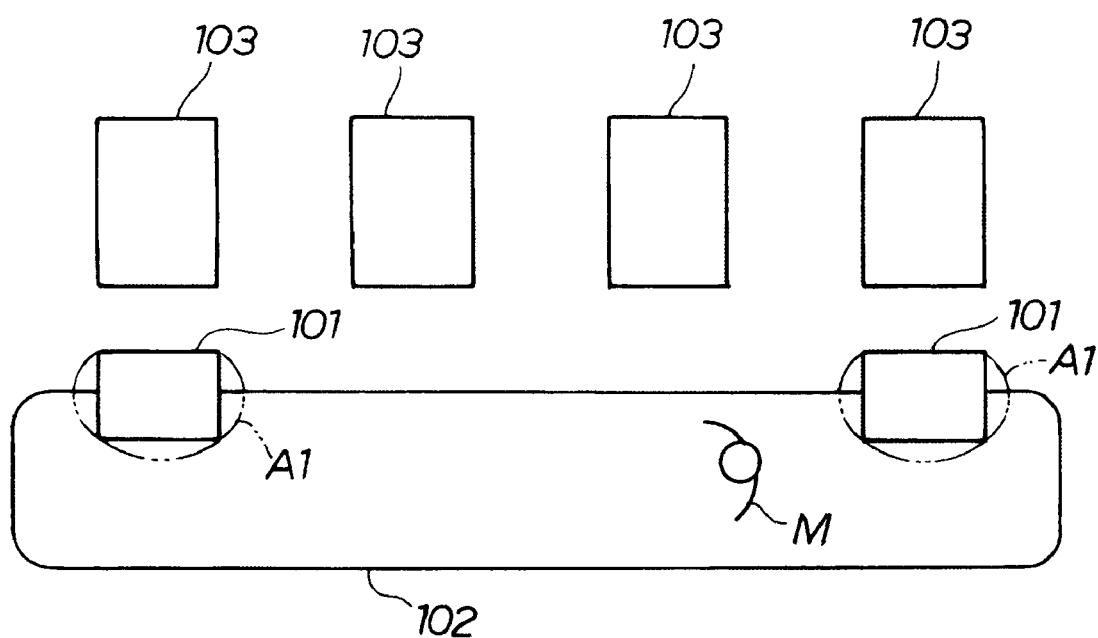
FIG. 12 is a view for explaining a conventional safety system.

FIGS. 11(a) and 11(b) are views for explaining the monitoring area at the time of high speed movement of the robot according to the exemplary embodiment of the invention. FIG. 11(a) shows the monitoring area 53 immediately before the robot 20 starts to move at a high speed. The monitoring area 53 is set by expanding the detecting planes S1, S3 in a returning direction Y. The high speed movement is started, after the detecting section (numeral 43 in FIG. 1) has confirmed that there is no obstacle in the monitoring area 53. This monitoring area 53 is controlled by the monitoring area control section (numeral 42 in FIG. 1) on the basis of the positional information, the speed information of "stopping", and the directional information of "the returning direction" which are outputted from the robot control section (numeral 41 in FIG. 1).

FIG. 11(b) shows the monitoring area 53 during the high speed movement of the robot 20, in which the robot 20 moves at a high speed in the returning direction Y. In this case, the monitoring area 53 is set by contracting the detecting planes S1, S3 according to the working area 61 of the robot. This monitoring area 53 is controlled by the monitoring area control section (numeral 42 in FIG. 1) on the basis of the positional information, the speed information of "the high speed movement", and the directional information of "the returning direction" which are outputted from the robot control section (numeral 41 in FIG. 1).

In short, the safety system is characterized in that the monitoring area control section (numeral 42 in FIG. 1) changes the monitoring area 53 to such shapes as shown in FIG. 10(a), FIG. 10(b), FIG. 11(a), and FIG. 11(b), according to the movement of the robot 20. Because the monitoring area corresponding to the movement of the apparatus is set by this structure, effective use of the working station area can be made.

Preferably, controls for expanding (see FIG. 11(a)) and contracting (see FIG. 11(b)) the monitoring area 53 in front of the apparatus may be conducted according the moving speed.

During the high speed movement of the apparatus, the monitoring area is expanded forward, whereby safety of the operators can be secured and improvement of productivity can be achieved.

Further, although the monitoring area is changed according to the moving direction and the moving speed of the robot in this embodiment, it is also preferable that the monitoring area may be changed according to the movement of the robot, even in case where the robot stops for working at a particular place.

Although the present invention has been fully described hereinabove, referring to the specified embodiments, it is apparent to those skilled in the art that various modifications and variations can be added to the invention without deviating from the sprit and scope of the invention.

This application is based on Japanese Patent Application No. 2005-151299 filed on May 24, 2005, contents of which are hereby incorporated by reference.

INDUSTRIAL APPLICABILITY

This invention is favorably applied to the working station where the operator coexists with the apparatus such as the robot.

The invention claimed is:

1. A working station comprising:
a carriage adapted to receive a human operator and on which a work is transported from one location to another location;
an apparatus that is movably mounted adjacent to the carriage and adapted to move relative to the carriage and perform an operation on the work as said work is transported by the carriage; and
a monitoring area control section that sets a monitoring area for monitoring presence or absence of an obstacle around the apparatus, said monitoring area control section being operable to change the monitoring area according to a moving direction and a moving speed of the apparatus relative to the carriage.

2. The working station according to claim 1, wherein the monitoring area control section expands or contracts the monitoring area in front of the apparatus according to the moving speed of the apparatus relative to the carriage.

* * * * *